US007212193B2

(12) United States Patent
Ueda

(10) Patent No.: US 7,212,193 B2
(45) Date of Patent: May 1, 2007

(54) METHOD AND CIRCUIT FOR DRIVING DISPLAY, AND PORTABLE ELECTRONIC DEVICE

(75) Inventor: Hideki Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 570 days.

(21) Appl. No.: 10/247,037

(22) Filed: Sep. 19, 2002

(65) Prior Publication Data

US 2003/0052873 A1 Mar. 20, 2003

(30) Foreign Application Priority Data

Sep. 19, 2001 (JP) ............................ 2001-285838

(51) Int. Cl.
*G06F 3/00* (2006.01)

(52) U.S. Cl. .......................... 345/204; 345/36; 345/46; 345/76; 345/90; 348/500; 348/521

(58) Field of Classification Search .................... 345/1, 345/9, 30, 42, 55, 100, 103, 213, 24, 36, 345/39, 46, 76, 90, 204, 294; 348/500, 521, 348/529, 540, 547; 349/19
See application file for complete search history.

(56) References Cited

U.S. PATENT DOCUMENTS 3,939,643 A * 2/1976 Nishikubo ................... 368/87
5,408,331 A * 4/1995 Ota ............................ 386/106
5,436,622 A * 7/1995 Gutman et al. .............. 340/7.6
5,587,683 A * 12/1996 Kawasaki et al. .......... 327/538
5,699,085 A * 12/1997 Takei et al. ................. 345/531
5,726,677 A * 3/1998 Imamura ...................... 345/99
5,745,207 A * 4/1998 Asada et al. ................ 349/141
5,804,894 A * 9/1998 Leeson et al. .............. 307/130
5,877,740 A * 3/1999 Hirakata et al. ............ 345/103
5,886,954 A * 3/1999 Asami et al. ................. 368/67
5,912,713 A * 6/1999 Tsunoda et al. ............ 348/540
6,020,865 A * 2/2000 Okuda et al. ................. 345/82
6,043,814 A * 3/2000 Lim ........................... 715/700
6,201,529 B1 * 3/2001 Shimizu ..................... 345/593
6,611,476 B1 * 8/2003 Obasawa et al. ............. 368/82
2001/0002833 A1* 6/2001 Narui .......................... 345/418
2001/0045929 A1* 11/2001 Prache et al. ................. 345/89
2001/0054018 A1* 12/2001 Kuribayashi et al. ......... 705/27
2001/0055008 A1* 12/2001 Young et al. ............... 345/204
2002/0011994 A1* 1/2002 Imamura .................... 345/204

FOREIGN PATENT DOCUMENTS

CN 123981 12/1999
JP 9-325729 12/1997

OTHER PUBLICATIONS

Kataoka, Satoshi; Dot Matrix Display Devicel Pub. No. JP409325729 A, Pub. Date Dec. 16, 1997.*
{Pixel circuit, Display Device having Current-Driven Light-Emitting device; EP0923067; Mutsumi Kimura; Pub. Date: Jun. 16, 1999.*

* cited by examiner

*Primary Examiner*—Bipin Shalwala
*Assistant Examiner*—Vincent E. Kovalick
(74) *Attorney, Agent, or Firm*—Scully, Scott, Murphy & Presser, P.C.

(57) ABSTRACT

A method for driving a display is provided which is capable of reducing current consumption. In the method above, a scanning frequency in a self-emissive display is changed based on a display content to be displayed in the self-emissive display.

36 Claims, 6 Drawing Sheets

METHOD AND CIRCUIT FOR DRIVING DISPLAY, AND PORTABLE ELECTRONIC DEVICE

BACKGROUND OF THE INVENTION

1. Field of the Invention

The present invention relates to a method for driving a display made up of a current-driving type light-emitting device which displays various pieces of information, results of measurement, moving pictures, or still pictures and to a circuit employing the above method and to portable electronic devices incorporating the circuit and more particularly to the method for driving the display which is used as a display device of computers such as notebook computers, palm-sized computers, pocket computers, or a like, of portable electronic devices such as a PDA (Personal Digital Assistant), a portable cellular phone, or a PHS (Personal Handy-phone System) and to the circuit employing the above method and to the portable electronic devices being equipped with driving circuits for the display.

The present application claims priority of Japanese Patent Application No.2001-285838 filed on Sep. 19, 2001, which is hereby incorporated by reference.

2. Description of the Related Art

Some types of displays are made up of current-driving type light-emitting devices. The displays of this kind conventionally include a display made up of an EL (Electroluminescnece) device, a display made up of an LED (Light-Emitting Diode), a VFD (Vacuum Fluorescent Display) including, in particular, an FED (Field Emission Display) being one of types of the VFDs, a PDP (Plasma Display Panel), or a like. Hereinafter, this type of the display is called a “self-emissive type display”.

Generally, the self-emissive type display tends to draw current more than a voltage-driving type liquid crystal display. That is, in the voltage-driving type liquid crystal display, since its liquid cell is a capacitive load, an amount of current consumed is as little as several mA. However, since the self-emissive type display emits light for every pixel and therefore consumes current every time it emits light, an amount of current consumed reaches 200 mA or more when high current volumes are consumed, for example, when an image is displayed at a high value of luminance. Therefore, when the self-emissive type display is used in a displaying section of a portable electronic devices to which power is supplied by a battery, dry cell, or a like, to keep operating time as long as possible, an amount of current consumed has to be reduced to a minimum. The portable electronic devices include notebook-type, palm-type, or pocket-type computers, PDAs, or portable cellular telephones, PHSs, or a like.

The portable cellular phone or the PHS has a waiting mode in which, though power is provided, a user does not perform any operation while waiting for an incoming call. The displaying section provides a waiting screen corresponding to a waiting mode.

Not only the portable cellular phone or the PHS but also other portable electronic devices when, though power is provided, and a specified time has elapsed without any operations performed by a user, as shown in FIG. 8, is put into a screen save mode in which a specified character or diagram is displayed randomly on each portion on the display at every specified time and a moving object is displayed on the display. FIG. 8 shows that a current time indicated by the self-emissive type display in the portable cellular phone or the PHS is displayed in the screen save mode in a manner that a place for displaying time is changed at every specified time. The screen save mode is used to prevent occurrence of a phenomenon called an “image burn-in” state in which same characters or same diagrams continue to be displayed for a long time, even if power is turned OFF, a trace of the character or the diagram is left. The user, when such portable electronic devices are in the waiting mode or in the screen save mode, does not view the screen of a display carefully.

However, conventionally, even when the user drives a screen of a display in a waiting mode or lowers luminance of each pixel in a screen save mode, the user employs the same driving method as is used for driving the ordinary screen on which the user views the screen carefully. For this reason, in the former case, power is drawn wastefully. Moreover, in the latter case, the display becomes dark as a whole and are hard to view and, therefore, if the user views the display unexpectedly, the user cannot confirm contents of the display immediately and misunderstands, in some cases, that power has not been provided.

In some cases, as shown in FIG. 9, the display screen of the conventional portable cellular phone or the PHS is made up of, for example, an upper display portion 1, a central display portion 2, and a lower display portion 3. In the upper display portion 1, a battery mark 1*a* indicating a charging state of a battery, an antenna mark 1*b* indicating whether or not the portable cellular phone or the PHS being presently used is in a service area of a wireless telephone system of a mobile communication network, or a like are displayed. In the central display portion 2, sentences of electronic mail, images being attached to the electronic mail, and images indicating contents being provided from various contents providers in a WWW (World Wide Web) server or a like are displayed. FIG. 9 shows an example in which map data is displayed in the central display portion 2. In the lower display portion 3, a menu key used to select a menu is displayed. Then, generally, in the central display portion 2 is displayed a detailed image, while in the upper display portion 1 and in the lower display portion 3 are displayed a character and/or a mark in a simplified manner. This is because, even if the character and/or mark is simplified, information can be fully transferred to the user of the portable cellular phone or the PHS.

However, conventionally, even in the case of the upper display portion 1 and in the lower display portion 3 in which such simplified characters or marks are displayed, a same driving method as is used to display in the central display portion 2 in which detailed images are displayed is employed. This causes wasteful power consumption. The same inconveniences as described above occur in other portable electronic devices to which power is supplied by the battery or the dry cell such as the notebook-type, the palm-type, and pocket-type computers, the PDA or the like, though contents and portions displayed therein (for example, in a window), or a like are different.

SUMMARY OF THE INVENTION

In view of the above, it is an object of the present invention to provide a method for driving a display which is capable of reducing current consumption, a circuit employing the method and portable electronic devices incorporating the circuit.

According to a first aspect of the present invention, there is provided a method for driving a display including:

a step of changing a scanning frequency of the display based on a display content to be displayed on the display made up of a current-driving type light emitting device.

In the foregoing, a preferable mode is one wherein, when the display content is made up of a plurality of display regions having a different characteristic, the scanning frequency is changed according to the corresponding characteristic for each of the plurality of display regions.

Also, a preferable mode is one wherein the change of the scanning frequency is made by changing a frequency dividing ratio of an oscillating signal to be produced to drive the display.

Also, a preferable mode is one wherein scanning is performed sequentially on every one, every two or every three scanning electrodes for the display based on the display content.

Also, a preferable mode is one wherein, when the display content is made up of a plurality of display regions having the different characteristic, scanning is performed sequentially on every one, every two or every three scanning electrodes for the display in each of the plurality of display regions.

Also, a preferable mode is one wherein scanning is performed on only a scanning electrode of the display corresponding to a region in which the display content is to be displayed.

Also, a preferable mode is one wherein the display content itself is changed according to the display content.

Also, a preferable mode is one wherein the display is any one of displays made up of an electroluminescence device, a display made up of a light emitting diode, a display made up of a vacuum fluorescent display tube, a field emission display, or a plasma display.

According to a second aspect of the present invention, there is provided a driving circuit for a display including:

an oscillator to produce an oscillating signal having a specified frequency;

a frequency divider to divide a frequency of the oscillating signal at a specified frequency dividing ratio and to output it as a clock:

a controller to change a frequency dividing ratio of the frequency divider based on a designating signal used to set a scanning frequency of the display produced based on a display content to be displayed on the display made up of a current-driving type light emitting device; and a row driver to generate an incoming voltage based on the clock and to the incoming voltage to each scanning electrode of the display.

In the foregoing, a preferable mode is one wherein the designating signal, when the display content is made up of a plurality of display regions having a different characteristic, is generated to change the scanning frequency according to the corresponding characteristic in each of the plurality of display regions.

According to a third aspect of the present invention, there is provided a driving circuit for a display including:

an oscillator to generate an oscillating signal having a specified frequency;

a plurality of frequency dividers to divide a frequency of the oscillating signal at a specified frequency dividing ratio and to output it as a clock;

a controller to generate and output a selecting signal indicating which clock output from the plurality of the frequency dividers is to be selected based on a display content to be displayed on the display made up of a current-driving type light emitting device; and a row driver to select which clock output from the plurality of the frequency dividers based on the selecting signal and to generate an incoming voltage based on the selected clock and to feed the generated incoming voltage to each of scanning electrodes of the display.

Also, a preferable mode is one wherein the controller, when the display content is made up of a plurality of display regions having a different characteristic, generates the selecting signal according to the corresponding characteristic in each of the plurality of the display regions.

Also, a preferable mode is one wherein the controller, based on the display content, sequentially has the row driver scan every one, every two or every three scanning electrodes of the display.

Also, a preferable mode is one wherein the controller, when the display content is made up of the plurality of the display regions having the different characteristic, sequentially has the row driver scan every one, every two or every three scanning electrodes of the display in each of the plurality of the display regions.

Also, a preferable mode is one wherein the controller has the row driver scan only a scanning electrode of the display corresponding to a region in which the display content is to be displayed.

Also, a preferable mode is one wherein the controller changes the display content according to the display content.

Also, a preferable mode is one wherein the display is any one of displays made up of an electroluminescence device, a display made up of a light emitting diode, a display made up of a vacuum fluorescent display tube, a field emission display, or a plasma display.

According to a fourth aspect of the present invention, there is provided a portable electronic device including:

a display made up of a current-driving type light emitting device;

the driving circuit for the display as described above;

a main control section to control each component; and wherein the main control section feeds the display content and the designating signal to the controller in the driving circuit.

In the foregoing, a preferable mode is one that wherein includes a main body and an acceleration sensor to detect vibration applied to the main body and to generate a vibrating signal and wherein the main control section, when the vibrating signal is at a level being not less than a specified value, changes the designating signal.

Also, a preferable mode is one wherein the main control section changes the designating signal according to a remaining amount of electromotive force of a battery or a dry cell.

According to a fifth aspect of the present invention, there is provided a portable electronic device including:

a display made up of a current-driving type light emitting device;

a driving circuit of the display described above, a main control section to control each component; and wherein the main control section feeds the display content to the controller in the driving circuit.

In the foregoing, a preferable mode is one that wherein includes a main body and an acceleration sensor to detect vibration applied to the main body and to produce a vibrating signal, wherein the main control section, when the vibrating signal is at a level being not less than a specified value, generates a switching signal used to designate switching of a clock and feeds it to the controller and wherein the controller, based on the switching signal, changes a selecting signal.

Also, a preferable mode is one wherein the main control section generates the switching signal according to a remaining amount of electromotive force of a battery or a dry cell.

Also, a preferable mode is one wherein the display content is displayed in at least two screens including a waiting screen in which, though power is applied, a user is waiting for an incoming call without the user using any operation, a screen save screen which displays the waiting screen and which is displayed to prevent image burn-in after a specified time has elapsed, an operation screen which is displayed when the user performs various operations, an electronic mail screen in which electronic mail being under creation and having received is displayed, and a conversation screen which is displayed during conversation.

Also, a preferable mode is one wherein the display is any one of displays made up of an electroluminescence device, a display made up of a light emitting diode, a display made up of a vacuum fluorescent display tube, a field emission display, or a plasma display.

With the above configurations, since scanning frequency of the display is changed based on the display content occurring on the display made up of the current-driving type light-emitting device, current consumption can be reduced.

With another configuration, since the acceleration sensor to detect vibration to be applied to the main body and to generate the vibration signal is placed and since the main control section, when the vibration signal exceeds the specified value, changes the designating signal and since the controller, based on the switching signal produced and fed by the main control section, changes the selecting signal, even if the user views carefully a screen requiring some clearness as in the case of the operation screen or of the electronic mail screen while the user is walking, that is, the portable electronic device is vibrating, the screen does not shake.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
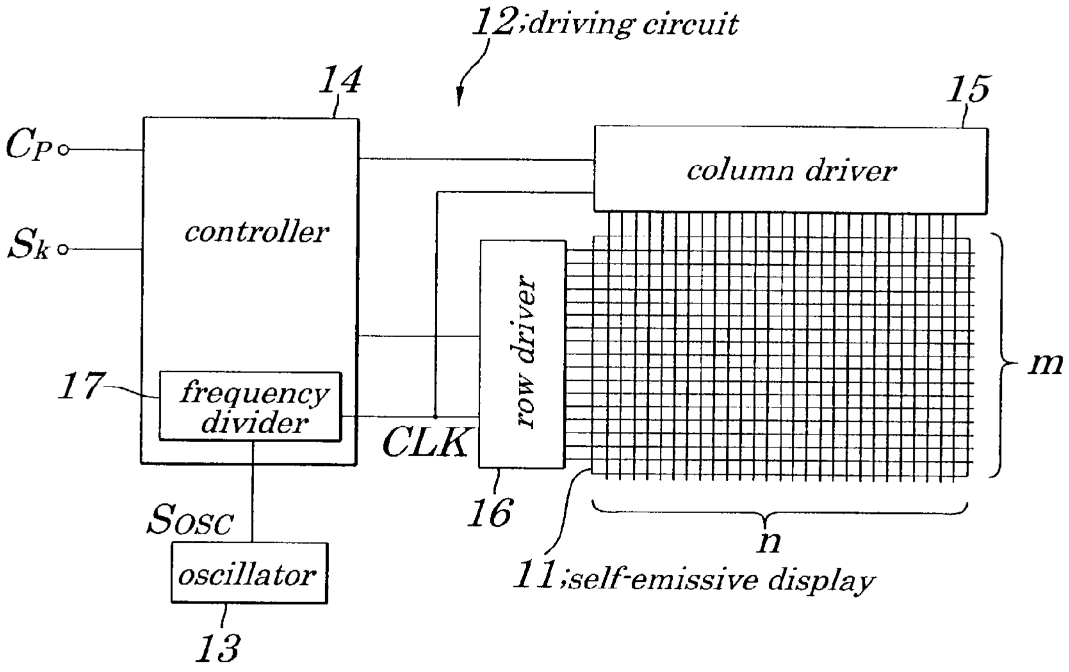
FIG. 1 is a schematic block diagram showing configurations of a driving circuit for a self-emissive display according to a first embodiment of the present invention.

FIG. 1 is a schematic block diagram showing configurations of a driving circuit 12 for a self-emissive display 11 according to a first embodiment of the present invention. The self-emissive display 11 of the first embodiment is made up of a current-driving type light emitting device in which a region surrounded by "m" ("m" is a natural number) pieces of scanning electrodes placed at specified intervals in a row direction and "n" ("n" is a natural number) pieces of data electrodes placed at specified intervals in a column direction is used as a pixel. A number of pixels of an entire display screen is (n×m) pieces. In the case of a portable cellular phone, for example, "n"=132 and "m"=162 and the number of pixels of the entire display screen is 21,384 pieces. The self-emissive display 11 includes a display made up of an EL device, a display made up of a light-emitting diode, a VFD including, in particular, an FED being one of types of the VFDs, a PDP, or a like.

Moreover, the driving circuit 12 for the self-emissive display 11 of the first embodiment includes an oscillator 13, a controller 14, a column driver 15, and a row driver 16. The oscillator 13 generates an oscillation signal $S_{OSC}$ having a specified frequency and feeds it to the controller 14. The controller 14, based on a display content $C_P$ fed from an outside, controls the column driver 15 and the row driver 16 to cause a pixel to emit light in the self-emissive display 11. A frequency divider 17 is mounted inside of the controller 14. The frequency divider 17 divides a frequency of the oscillation signal $S_{OSC}$ fed from the oscillator 13 at a frequency-dividing ratio (1/k) ("k" is a natural number) designated by a designating signal $S_K$ used to designate the frequency-dividing ratio (1/k) supplied from an outside and feeds a frequency-divided signal, as a clock CLK, to the column driver 15 and row driver 16. In the embodiment, a frequency of the oscillation signal $S_{OSC}$ is set to be 6 MHz and its frequency-dividing ratio (1/k) is 1/100,000, 1/80,000, and 1/66,667. That is, the frequency divider 17 divides the frequency of the oscillation signal $S_{OSC}$ so that a frequency of clock CLK is 60 Hz, 75 Hz, or 90 Hz.

The column driver 15, under control of the controller 14, feeds a driving current to the "n" pieces of data electrodes, in order to cause each pixel of the self-emissive display 11 to emit light. Moreover, the column driver 15, based on the clock CLK fed from the controller 14, gets information about which scanning electrode in the self-emissive display 11 is scanned. The row driver 16, under control of the controller 14, based on the clock CLK fed from the controller 14, generates an incoming voltage and feeds it to each of the "m" pieces of scanning electrodes in the self-emissive display 11.

Figure 2:
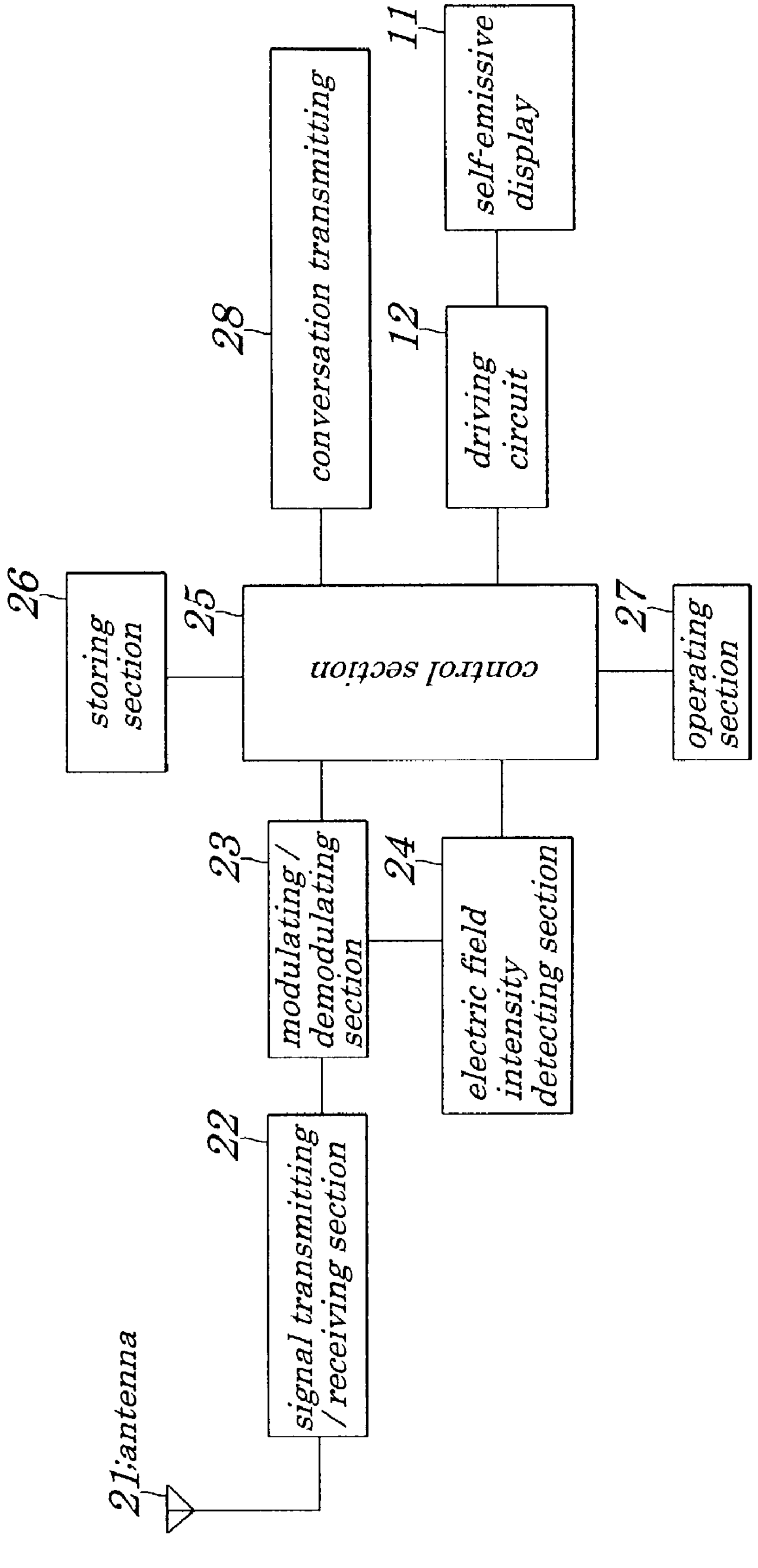
FIG. 2 is a schematic block diagram showing configurations of a portable cellular phone being equipped with the driving circuit according to the first embodiment of the present invention.

Moreover, FIG. 2 is a schematic block diagram showing configurations of a portable cellular phone being equipped with the driving circuit 12 for the self-emissive display 11 shown in FIG. 1. The portable cellular phone of the embodiment chiefly includes an antenna 21, a signal transmitting/receiving section 22, a modulating/demodulating section 23, an electric field intensity detecting section 24, a control section 25, a storing section 26, an operating section 27, a conversation transmitting and receiving section 28, the above self-emissive display 11, and the above driving circuit 12.

The signal transmitting/receiving section 22 receives a portable cellular phone signal fed from a parent device placed at a base station or indoors and feeds it to the modulating/demodulating section 23 and then transmits the portable cellular phone signal fed from the modulating/demodulating section 23 through the antenna 21 to the base station or the parent device. The modulating/demodulating section 23 demodulates a voice signal, video signal, communication data, or control signal from a portable cellular phone signal fed from the signal transmitting/receiving section 22 and feeds the demodulated signal to the control section 25 and, at the same time, modulates the voice signal, video signal, communication data, or control signal to a portable cellular phone signal and then feeds the modulated signal to the signal transmitting/receiving section 22. The electric field intensity detecting section 24, based on the demodulated signal fed from the modulating/demodulating section 23, detects an electric field intensity of the portable cellular phone signal received by the antenna 21.

The control section 25 is made up of a CPU, a DSP (Digital Signal Processor), a sequencer, or a like and controls each component of the portable cellular phone by executing programs or a like stored in the storing section 26 or a storing portion incorporated therein. Moreover, the control section 25 performs internal processing therein using a control signal fed from the modulating/demodulating section 23, processing on the voice signal fed from the modulating/demodulating section 23 to feed it to the conversation transmitting and receiving section 28 and then processing on the voice signal fed from the conversation transmitting and receiving section 28 to feed it to the modulating/demodulating section 23. Moreover, the control section 25 controls the driving circuit 12 to display a character or an image on the self-emissive display 11 based on a video signal or communication data fed from the modulating/demodulating section 23 or on character data or image data being stored in the storing section 26. That is, the control section 25 feeds a display content $C_P$ to be displayed on the self-emissive display 11 such as a video signal, character data, image data, or a like to the driving circuit 12 and supplies a designating signal SK used to designate a frequency-dividing ratio (1/k) in order to set a scanning frequency for the self-emissive display 11, based on the display content $C_P$.

The storing section 26 is made up of semiconductor memories such as a RAM (Random Access Memory), a ROM (Read-Only Memory) or a like, in which a telephone number of a destination set by a user, electronic mail to be transmitted to a destination input by the user, image data transmitted from a destination, image data indicating contents provided by various content providers for a WWW server, music data or a like are stored whenever the user manipulates the operating section 27. The operating section 27 is made up of a ten-key used to input a telephone number of a destination, a sentence of electronic mail, or a like, various keys including a cursor key, a power source key, a menu key, or a like. The conversation transmitting and receiving section 28 is made up of a speaker and a microphone and emits a voice from a speaker (not shown), based on a voice signal fed from the control section 25 and feeds a voice signal converted from a voice by the microphone to the control section 25 to use it for conversation with a destination.

Next, operations of the portable cellular phone having configurations described above, mainly operations of the driving circuit 12 for the self-emissive display 11 will be described.

First, the control section 25 feeds a display content $C_P$ such as a video signal, character data, image data, or a like to be displayed on the self-emissive display 11 to the driving circuit 12 and, at the same time, the designating signal SK to the driving circuit 12. The controller 14, based on the display content $C_P$ fed from the control section 25, controls the column driver 15 and the row driver 16 to cause a required pixel to emit light in the self-emissive display 11. Therefore, the row driver 16 generates an incoming voltage according to a frequency of the clock CLK to be supplied from the controller 14 and sequentially feeds it to the first scanning electrode to the m-th scanning electrode of the self-emissive display 11. On the other hand, the column driver 15, under control of the controller 14 and based on the clock CLK fed from the controller 14, while getting information about which scanning electrode in the self-emissive display 11 is scanned, sequentially feeds a driving current to the data electrode corresponding to a pixel which is to emit light, out of data electrodes on a first column to data electrodes on the n-th column in the self-emissive display 11.

Therefore, a pixel corresponding to the display content $C_P$ in the self-emissive display 11 emits light having, as a scanning frequency, a frequency of the clock CLK fed from the controller 14. Here, the frequency of the clock CLK is determined by dividing a frequency of the oscillation signal $S_{OSC}$ from the oscillator 13 to be fed to the controller 14 at a frequency-dividing ratio (1/k) set at the frequency divider 17 making up the controller 14. The frequency-dividing ratio (1/k) is designated by the designating signal $S_k$ to be fed from the control section 25.

Figure 3:
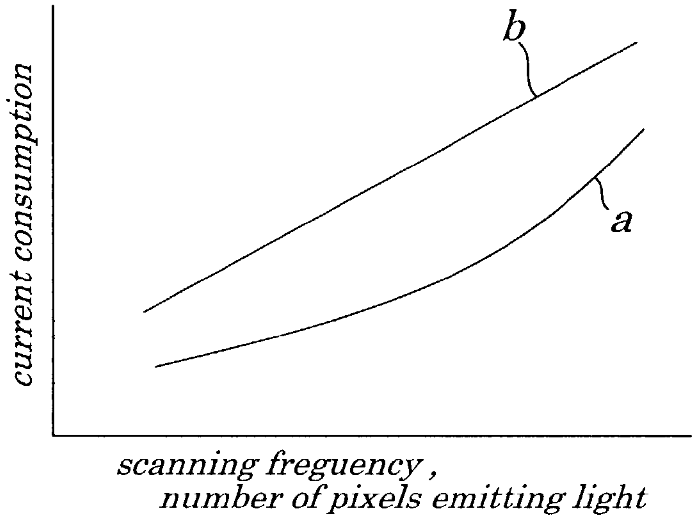
FIG. 3 is a graph explaining one example of a characteristic of current consumption of the self-emissive display to a number of pixels emitting light and scanning frequency according to the first embodiment of the present invention.

FIG. 3 is a graph explaining one example of a characteristic of current consumption of the self-emissive display 11 to a number of pixels emitting light and scanning frequency according to the first embodiment. In FIG. 3, a curve "a" shows an example of a characteristic curve of current consumption in the self-emissive display 11 to a scanning frequency and a curve "b" shows an example of a characteristic curve of current consumption of the self-emissive display 11 to a number of pixels emitting light. As is apparent, the current consumption is approximately proportional to the scanning frequency and the number of pixels emitting light. This is because, in the case of the scanning frequency, the higher the scanning frequency becomes, the shorter the time required for scanning one scanning electrode becomes and the longer an average light emitting time of each pixel becomes. On the other hand, in the case of the number of pixels emitting light, the larger the number of pixels to emit light becomes, the larger the entire current consumption becomes. Therefore, by having the control section 25 control the frequency-dividing ratio (1/k), in an arbitrary manner, of the frequency divider 17, thereby changing the scanning frequency of the self-emissive display 11, current consumption of the self-emissive display 11 can be reduced.

The display content $C_P$ used when the driving circuit 12 of the self-emissive display 11 of the embodiment is applied to the portable cellular phone is displayed on screens described below. That is, the screens include the waiting screen described above, a screen in which operations are in a screen save mode (hereinafter, called a "screen save screen"), a screen in which various operations are performed including selection of telephone numbers being stored in the storing section 26 and/or use of various contents (game, divination, map, or a like) having received (hereinafter, called an "operation screen"), a screen in which electronic mail being produced or having received is displayed (hereinafter called an "electronic mail screen"), and a screen in which telephone conversations are made (hereinafter, called an "telephone conversation screen").

These display contents $C_P$ can be classified according to a degree of concern, of recognition, of necessity, of satisfaction, or a like. For example, the user shows a low degree of concern and of necessity to the waiting screen, the screen save screen, and the conversation screen. However, if some characters or images are displayed in the waiting screen, the screen save screen, and the conversation screen, the user can easily recognize a type of the screen and, as a result, even if the screen is not clear, a high degree of recognition of the user is given to these screens and some degree of satisfaction can be provided to the user. In contrast, the user shows a high degree of concern and of necessity for the operation screen. If the screen is not clear, the user shows neither a high degree of recognition nor a high degree of satisfaction. On the other hand, the user does not show such a high degree of concern and of necessity to the electronic mail screen, and if a character is clearer than an image, the user shows a high recognition and some degrees of satisfaction to the screen. Moreover, the user shows a higher degree of recognition and some degree of satisfaction to the moving picture when compared with the still picture.

Then, in the embodiment, the control section 25, when the display content $C_P$ are the waiting screen, the screen save screen, or the conversation screen, feeds a designating signal $S_k$ used to designate the frequency-dividing ratio (1/k) in the above frequency divider 17 so that it is 1/100,000 to the driving circuit 12. The frequency divider 17 divides a frequency of the oscillation signal $S_{OSC}$ so that the frequency of the clock CLK becomes 60 Hz. The control section 25, when the display content $C_P$ is a moving picture in the electronic mail screen and operation screen, feeds the designating signal $S_k$ used to designate the frequency-dividing ratio (1/k) in the above frequency divider 17 so that it is 1/80,000 to the driving circuit 12. The frequency divider 17 divides a frequency of the oscillation signal $S_{OSC}$ so that a frequency of the clock CLK becomes 75 Hz. Moreover, the control section 25, when the display content $C_P$ is a still picture in the operation screen, feeds the designating signal $S_k$ used to designate the frequency-dividing ratio (1/k) in the above frequency divider 17 so that it is 1/66,667 to the driving circuit 12. The frequency divider 17 divides the frequency of the oscillation signal $S_{OSC}$ so that the frequency of the clock CLK becomes 90 Hz. Effects of reducing current consumption will be explained by simplified calculation. Let it be assumed that a frequency of the clock CLK is 90 Hz and current consumption in the self-emissive display 11 is 100%. If the frequency of the clock CLK is 75 Hz, the current consumption is reduced by about 16.7%. If the frequency of the clock CLK is 60 Hz, the current consumption is reduced by about 33.3%.

Thus, according to the embodiment, by controlling the frequency-dividing ratio (1/k) of the frequency divider 17 in an arbitrary manner according to the display content $C_P$ to be fed from an outside to change a scanning frequency of the self-emissive display 11, current consumption in the self-emissive display 11 can be reduced. Therefore, when the driving circuit 12 in the self-emissive display 11 is applied to the portable cellular phone, the degrees of concern, recognition, necessity, and satisfaction can be satisfied and, at the same time, current consumption can be reduced to a minimum. As a result, operation time for the portable cellular phone can be kept longer than usual. Moreover, in the embodiment, even if the waiting screen or screen save screen is being used, luminance of each pixel is not lowered unlike in the case of the conventional example and therefore the entire display does not become dark and the display content can be immediately recognized even when the user happens to view the display.

Second Embodiment

Figure 4:
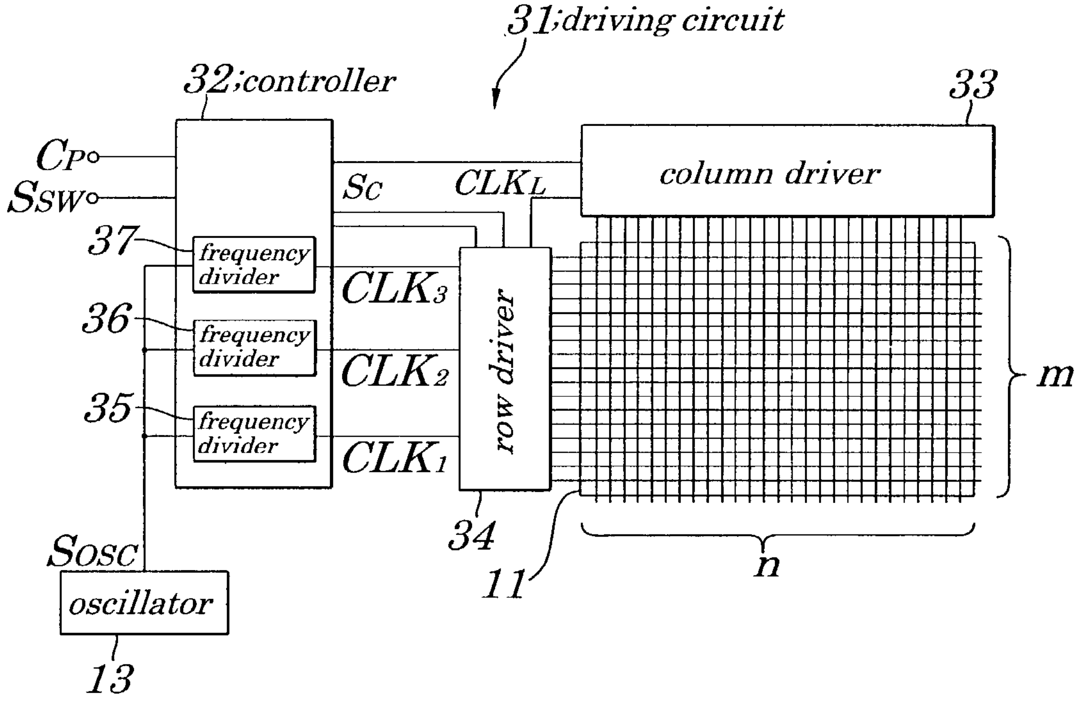
FIG. 4 is a schematic block diagram showing configurations of a driving circuit for a self-emissive display according to a second embodiment of the present invention.

FIG. 4 is a diagram showing configurations of a driving circuit 31 for a self-emissive display 11 according to a second embodiment of the present invention. In FIG. 4, same reference numbers are assigned to parts having the same function as those in FIG. 1 and its descriptions are omitted. In the driving circuit 31 for the self-emissive display 11 shown in FIG. 4, instead of a controller 14, a column driver 15, and a row driver 16, a controller 32, a column driver 33, and a row driver 34 are placed newly.

The controller 32, based on a display content $C_P$ to be fed from an outside, controls the column driver 33 and the row driver 34 to cause a required pixel to emit light in the self-emissive display 11. Moreover, the controller 32 produces a selecting signal $S_C$ indicating which clock out of clocks $CLK_1$ to $CLK_3$ is to be selected in accordance with the display content $C_P$ and a switching signal $S_{SW}$ fed from the outside and feeds it to the row driver 34. Moreover, inside of the controller 32 are placed three frequency divider 35 to 37 each having a different frequency-dividing ratio. The frequency divider 35 divides a frequency of an oscillation signal $S_{OSC}$ having a frequency of 6 MHz to be fed from an oscillator 13 at a frequency-dividing ratio 1/66,667 and feeds it as the clock $CLK_1$ having a frequency of 90 Hz to the row driver 34. The frequency divider 36 divides a frequency of the oscillation signal $S_{OSC}$ having a frequency of 6 MHz to be fed from the oscillator 13 at a frequency-dividing ratio 1/80,000 and feeds it as the clock $CLK_2$ having a frequency of 75 Hz to the row driver 34. The frequency divider 37 divides a frequency of the oscillation signal $S_{OSC}$ having a frequency of 6 MHz to be fed from the oscillator 13 at a frequency-dividing ratio 1/100,000 and feeds it as the clock $CLK_3$ having a frequency of 60 Hz to the row driver 34.

The column driver 33, under control of the controller 32, feeds a driving current to a data electrode to cause each pixel of the self-emissive display 11. Moreover, the column driver 33, based on a clock $CLK_L$ (FIG. 5) fed from the controller 32, gets information about which scanning electrode in the self-emissive display 11 is scanned. The row driver 34, under control of the controller 32, selects any one of the clocks $CLK_1$ to $CLK_3$ based on a selecting signal $S_C$ fed from the controller 32 and produces incoming voltages $V_{P1}$ to $V_{Pm}$ (shown in FIG. 5) based on the selected clock $CLK_L$ and then feeds them to each of scanning electrodes in self-emissive display 11.

Figure 5:
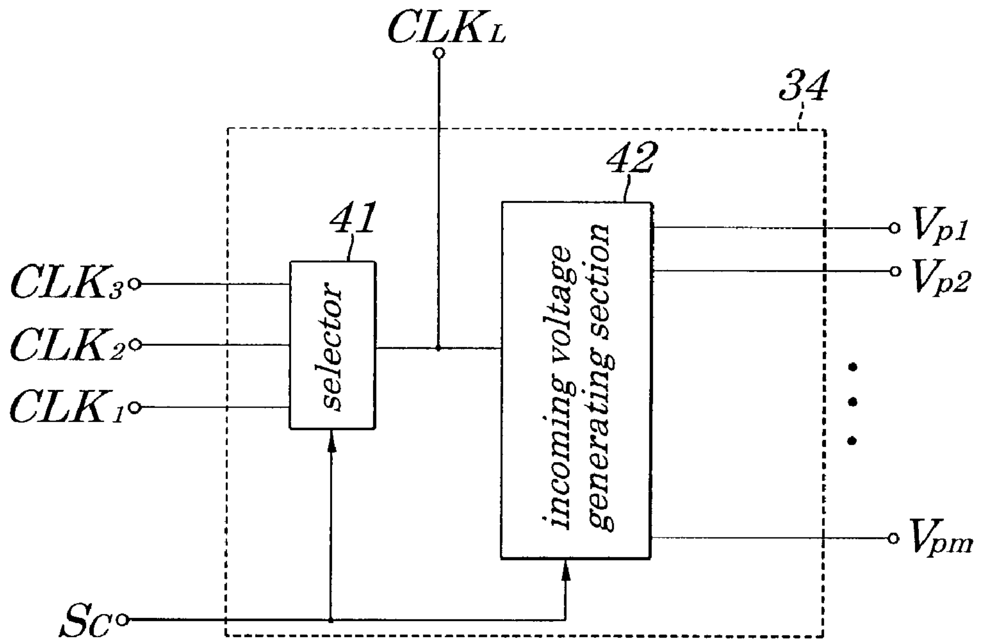
FIG. 5 is a schematic block diagram showing descriptions of a row driver making up the driving circuit according to the second embodiment of the present invention.

FIG. 5 is a schematic block diagram showing descriptions of the row driver 34 making up a driving circuit 31 according to the second embodiment of the present invention. The row driver 34 of the embodiment chiefly includes a selector 41 and an incoming voltage generating section 42. The selector 41 selects any one of the clocks $CLK_1$ to $CLK_3$ to be fed from the controller 32 based on the selecting signal $S_C$ fed from the controller 32 and feeds it as the clock $CLK_L$ to the incoming voltage generating section 42 and the column driver 33. The incoming voltage generating section 42 generates the incoming voltages $V_{P1}$ to $V_{Pm}$ based on the clock $CLK_L$ and feeds it each of scanning electrodes of the self-emissive display 11.

Figure 6:
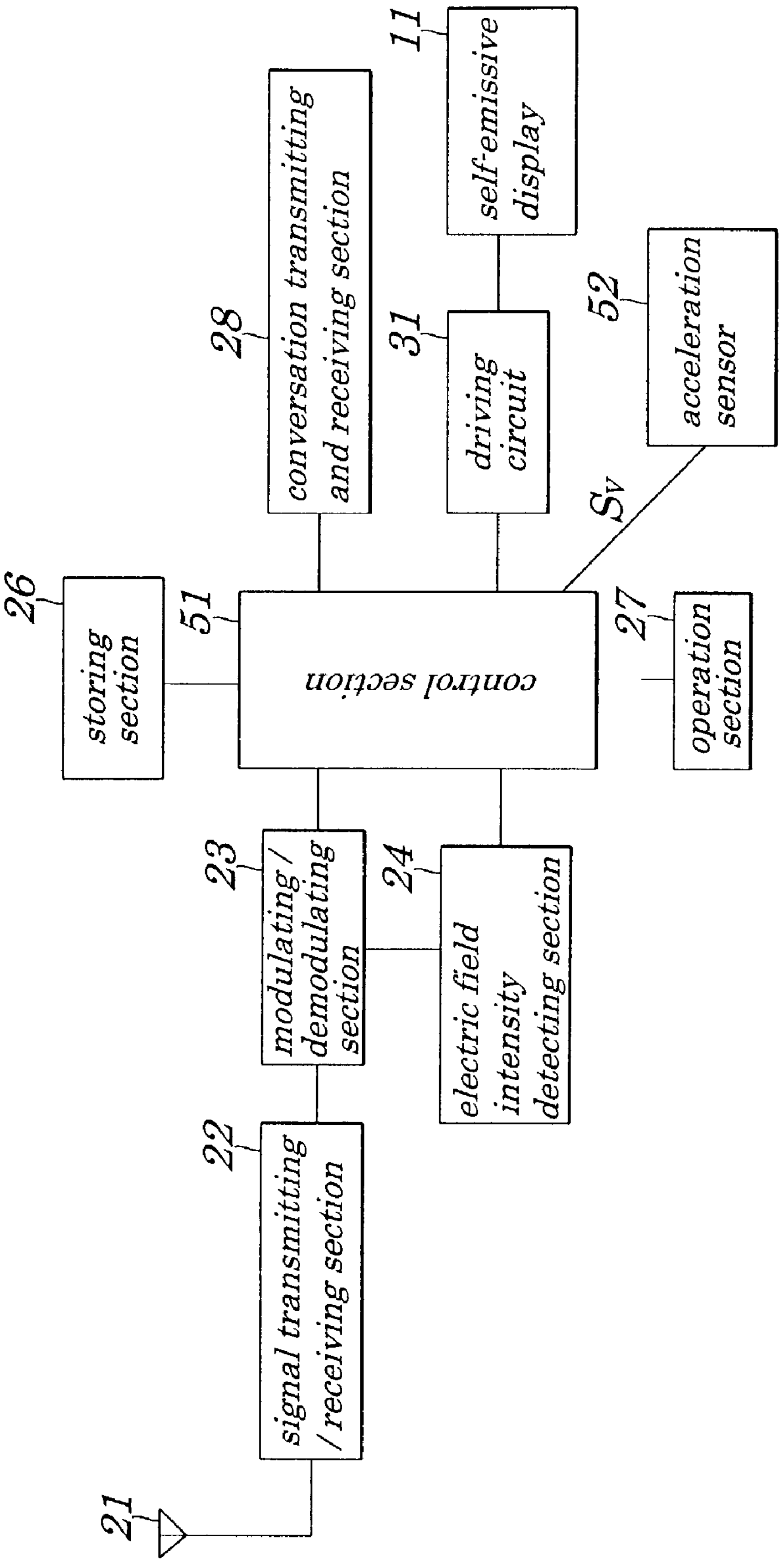
FIG. 6 is a schematic block diagram showing configurations of a portable cellular phone being equipped with the driving circuit according to the second embodiment of the present invention.

FIG. 6 is a schematic block diagram showing configurations of a portable cellular phone being equipped with the driving-circuit 31 for the self-emissive display 11 shown in FIG. 4. In FIG. 6, same reference numbers are assigned to parts having the same function as those in FIG. 2 and its descriptions are omitted. In the portable cellular phone shown in FIG. 6, instead of a driving circuit 12 and a control section 25 shown in FIG. 4, the driving circuit 31 and the control section 51 are newly placed and additionally an acceleration sensor 52 is mounted.

The control section 51 is made up of a CPU, DSP, sequencer, or a like and controls each component of the portable cellular phone by executing a program or a like being stored in a storing section 26 or in a storing portion embedded therein. Moreover, the control section 51 uses a control signal fed from a modulating/demodulating section 23 for processing therein and processes a voice signal fed from the modulating/demodulating section 23 to feed it to a conversation transmitting and receiving section 28 and also processes a voice signal fed from the conversation transmitting and receiving section 28 to feed it to the modulating/demodulating section 23. Moreover, the control section 51 controls the driving circuit 31 based on video signal or communication data fed from the modulating/demodulating section 23, character data or image data being stored in the storing section 26 in order to display a character or an image on the self-emissive display 11. That is, the control section 51 feeds the display content $C_P$ to be displayed on the self-emissive display 11 such as a video signal, character data, image data, or a like to the driving circuit 31 and, at the same time, generates the switching signal $S_{SW}$ based on a vibrating signal $S_V$ fed from the acceleration sensor 52. The acceleration sensor 52 is made up of a piezo-electric sensor, detects vibration to be applied to the portable cellular phone in a state where the user is walking or a like and generates the vibrating signal $S_V$ and feeds it to the control section 51.

Next, operations of the portable cellular phone having configurations described above, mainly operations of the driving circuit 31 for the self-emissive display 11 will be described.

First, the control section 51 feeds the display content $C_P$ to be displayed on the self-emissive display 11 such as the video signal, the character data, the image data, or the like to the driving circuit 31 and generates the switching signal $S_{SW}$ based on the vibrating signal $S_V$ to be fed from an acceleration sensor 52 and feeds it to the driving circuit 31. The controller 32, based on the display content $C_P$ to be fed from the control section 51, controls the column driver 33 and the row driver 34 to cause a required pixel in the self-emissive display 11 to emit light. Moreover, the frequency dividers 35 to 37 divide a frequency of the oscillation signal $S_{OSC}$ having a frequency of 6 MHz to be fed from the oscillator 13 at frequency-dividing ratios of 1/66,667, 1/80,000, and 1/100,000 respectively and feeds the frequency-divided signals as the clock $CLK_1$ having a frequency of 90 Hz, the clock $CLK_2$ having a frequency of 75 Hz, and the clock $CLK_3$ having a frequency of 60 Hz to the row driver 34, respectively. Moreover, the controller 32 generates the selecting signal $S_C$ according to the display content $C_P$ and the switching signal $S_{SW}$ fed from the control section 51 and feeds it to the row driver 34.

In the row driver 34, the selector 41 selects any one of the clocks $CLK_1$ to $CLK_3$ according to the selecting signal $S_C$ and the incoming voltage generating section 42 generates the incoming voltages $V_{P1}$ to $V_{Pm}$ based on the selected clock $CLK_L$ and feeds the generated incoming voltages $V_{P1}$ to $V_{Pm}$ sequentially to a scanning electrode on the first column until a scanning electrode on the m-th column in the self-emissive display 11. Also, the row driver 34 feeds the clock $CLK_L$ to the column driver 33. On the other hand, the column driver 33, under control of the controller 32, based on the clock $CLK_L$ fed from the controller 32, gets information about which scanning electrode in the self-emissive display 11 is scanned and sequentially feeds a driving current to a data electrode, out of the data electrode on the first column to the data electrode on the m-th column, corresponding to a pixel which is to emit light. Therefore, the pixel of the self-emissive display 11 corresponding to the display content $C_P$ emits light having, as a scanning frequency, respectively, frequencies 90 Hz, 75 Hz, 60 Hz of the clocks $CLK_1$ to $CLK_3$ fed from the controller 32.

Here, the selecting signal $S_C$ generated by the controller 32 according to the display content $C_P$ and the switching signal $S_{SW}$ fed from the control section 51 will be explained. A reason why the control section 51 generates the switching signal $S_{SW}$ based on the vibrating signal $S_V$ fed from the acceleration sensor 52 and feeds it to the driving circuit 31 is as follows. There is a risk that a screen shakes when a user carefully views the screen requiring some clearness as in the case of the above electronic mail screen in a state where the user is walking, that is, the portable cellular phone is vibrating. Then, if the control section 51, when the vibrating signal $S_V$ fed from the acceleration sensor 52 exceeds a specified value, generates the high-level switching signal $S_{SW}$ and feeds it to the driving circuit 31. The controller 32, when a high-level switching signal $S_{SW}$ is fed, even when the electronic mail screen appears, feeds the selecting signal $S_C$ to the row driver 34 to have the clock $CLK_1$ having a frequency of 90 Hz be selected.

As described above, as shown in FIG. 9, some display screens are made up of an upper display portion 1, a central display portion 2, and a lower display portion 3, in which detailed images are displayed in the central display portion 2 and a character or a mark is displayed in the upper display portion 1 and lower display portion 3 in a simplified manner. In the example, the clock CLK is switched in every display portion which causes current consumption to be reduced to a minimum. That is, the controller 32, when the display content $C_P$ is displayed on the operation screen and when the display portion is divided, for example, in a manner shown in FIG. 9, feeds the selecting signal $S_C$ at a time of activating the central display portion 2 in order to have the clock $CLK_1$ with a frequency of 90 Hz be selected and feeds the selecting signal $S_C$ to the row driver 34 at a time of activating the upper display portion 1 and the lower display portion 2 in order to have the clock $CLK_2$ with a frequency of 75 Hz and the clock $CLK_3$ with a frequency of 60 Hz be selected. In the row driver 34, as shown in FIG. 5, the selector 41 selects any one of the clocks $CLK_1$ to $CLK_3$ based on the selecting signal $S_C$ and the incoming voltage generating section 42 generates the incoming voltages $V_{P1}$ to $V_{Pm}$ based on the selected clock $CLK_L$ and then sequentially applies the incoming voltages to from the scanning electrode on the first column to the scanning electrode on the m-th column in the self-emissive display 11.

Figure 9:
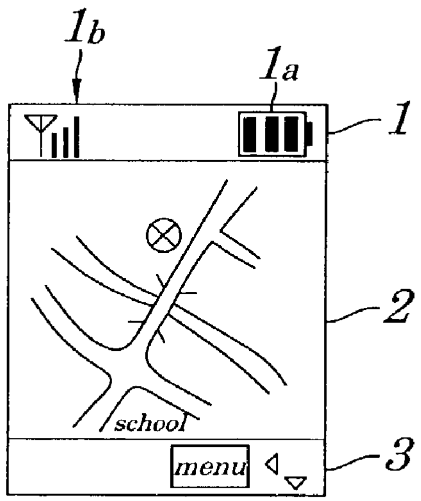
FIG. 9 (PRIOR ART)
FIG. 9 is a diagram showing an another example of a display screen of the conventional portable cellular phone or the PHS.

As described above, the controller 32, since the selecting signal $S_C$ is generated according to the display content $C_P$ and switching signal $S_{SW}$, for example, if the display content $C_P$ is displayed on the electronic mail screen and if the display portion is divided in a manner shown in FIG. 9 and when the high-level switching signal $S_{SW}$ is fed, generates the selecting signal $S_C$ with timing as described below. That is, the controller 32 originally feeds the selecting signal $S_C$ to the row driver 34, at a time of activating the central display portion 2 in order to have the clock $CLK_2$ having a frequency of 75 Hz be selected. However, in the embodiment, the controller 32 feeds the selecting signal $S_C$ to the row driver 34 in order to have the clock $CLK_1$ with a frequency of 90 Hz be selected and feeds the selecting signal $S_C$ to the row driver 34 at a time of activating the upper display portion 1 and the lower display portion 2 in order to have the clock $CLK_2$ with a frequency of 75 Hz or the clock $CLK_3$ with a frequency of 60 Hz be selected.

Thus, according to the embodiment, by selecting any one of the clocks $CLK_1$ to $CLK_3$ according to the display content $C_P$ and the switching signal $S_{SW}$ both being fed from the outside to change a scanning frequency of the self-emissive display 11, current consumption in the self-emissive display 11 can be reduced. When the driving circuit 31 of the self-emissive display 11 of the second embodiment is applied to the portable cellular phone, degrees of concern, recognition, necessity, and satisfaction can be satisfied more when compared in the first embodiment and current consumption can be reduced to a minimum. This enables longer operation time of the portable cellular phone to be secured. Moreover, even at a time of activating a waiting screen and screen save screen, unlike in the conventional case, since luminance of each pixel is not lowered, entire displays do not become dark and, even when the user views the display by chance, the display content $C_P$ can be confirmed immediately. Moreover, when the user carefully views the screen requiring some clearness as in the case of the above electronic mail screen in a state where the user is walking, that is, the portable cellular phone is vibrating, the screen does not shake.

It is apparent that the present invention is not limited to the above embodiments but may be changed and modified without departing from the scope and spirit of the invention. For example, in each of the embodiments, the display content $C_P$ itself fed from the outside, as it is, is displayed, however, the display content $C_P$ itself may be changed so as to be necessarily minimum (for example, in the waiting screen, displays for an antenna, battery mark, and time only) according to a type of the display content $C_P$ and the switching signal $S_{SW}$ or may be configured so that a number of display pixels is reduced. This method is effective in the waiting screen, the screen save screen, and the moving picture in particular and does not give the user a sense of incongruity. Moreover, in each of the above embodiments, three frequencies, for example 90 Hz, 75 Hz, and 60 Hz are used as the frequencies of the clock, however, another frequency of the clock may be used which contains for example 80 Hz, 65 Hz, or 50 Hz and also a combination of these six frequencies may be used. Moreover, the frequencies may be for example 2 frequencies, 4 frequencies, 5 frequencies, or 6 frequencies. The frequency of the clock being not less than 90 Hz, for example, 105 Hz and 120 Hz may be used. The frequency of the clock being not more than 50 Hz, for example, 45 Hz and 30 Hz may be used. That is, the frequency of a clock is associated with visual sensation. Therefore, if the display content $C_P$ is a still picture displayed on the operation screen, a frequency that does not cause visible flicker. If the display content $C_P$ is a moving picture displayed in the electronic mail screen or the operation screen, a frequency that does or does not cause visible flicker. If the display content $C_P$ is displayed on the waiting screen, the screen save screen, or the conversation screen, a frequency that may or may not cause visible flicker.

Moreover, in each of the embodiments, a frequency dividing ratio of the clock is changed according to the display content $C_P$ and any one of the clocks $CLK_1$ to $CLK_3$ is selected according to the display content $C_P$ and the switching signal $S_{SW}$, however, the frequency dividing ratio is changed or any one of the clocks $CLK_1$ to $CLK_3$ may be selected according to a remaining amount of electromotive force of a battery or a dry cell. That is, in ordinary cases, in the portable cellular phone or PHS, a remaining amount of electromotive force of the battery or dry cell is detected using a voltage and, for example, as shown in FIG. 9 and the remaining amount of electromotive force is displayed with a battery mark $\mathbf{1}_a$ that can provide three steps. At the first and second step in which a remaining amount of electromotive force of the battery or dry cell is sufficient, a frequency dividing ratio of the clock is changed or the clock is selected by using a method disclosed in each of the above embodiments, however, at the third step in which a remaining amount of electromotive force of the battery or dry cell is not sufficient, a frequency dividing ratio of the clock may be changed so as to be more, or a clock having a lower frequency may be selected. At the third step, time requiring to move from the waiting screen to the screen save screen may be shortened (for example, shortened from sixty seconds down to thirty seconds, thereby reducing required time by thirty secondes) or the display content itself may be reduced.

Also, in each of the above embodiments, the row driver applies m-pieces of generated incoming voltages sequentially to from the scanning electrode on the first column to the scanning electrode on the m-th column in the self-emissive display 11. The present invention is not limited to the above embodiment. That is, the row driver supplies m/2 pieces of or m/3 pieces of incoming voltages according to the display content $C_P$ and/or a switching signal $S_{SW}$ to every one, every two or every three out of m-pieces of the scanning electrodes in the self-emissive display 11. In this case, by simplified calculation, current consumption can-be reduced to one half or one third. This method can be combined with that employed in the first or second embodiment, with that employed in the case where a display content $C_P$ is changed, and with that employed in the case where the frequency dividing ratio or the clock is changed according to the remaining amount of electromotive force of a battery or a dry cell. In this case, current consumption can be reduced more.

Figure 7:
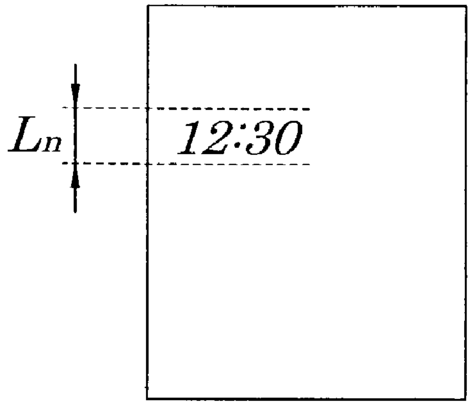
FIG. 7 is a diagram showing one example of a display screen to explain a driving method for a display of a modified embodiment of the first and second embodiments of the present invention.
Figure 8:
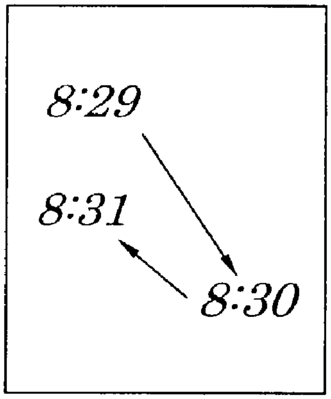
FIG. 8 (PRIOR ART)
FIG. 8 is a diagram showing an example of a display screen of a conventional portable cellular phone or a PHS.

Also, in each of the above embodiments, a character or an image is displayed by scanning entire m-pieces scanning electrodes in the self-emissive display 11, however, for example, as shown in FIG. 7, when current time only is displayed on the screen save screen, $L_n$ pieces of the scanning electrodes only corresponding to the time to be displayed out of m-pieces of scanning electrodes may be scanned. This enables further more reduction of current consumption. This method can be combined with that employed in the first or second embodiment, with that employed in the case where the display content C is changed, and with that employed in the case where the frequency dividing ratio or the clock is changed according to the remaining amount of electromotive force of a battery or a dry cell, and with that employed in the case where an incoming voltage is thinned out. In this case, current consumption can be reduced more. On the screen save screen, not only time but also a battery mark may be used.

Also, in the above second embodiment, the controller 32, when the display content $C_P$ is displayed in the electronic mail screen and when the high-level switching signal $S_{SW}$ is fed, the selecting signal $S_C$ is output in order to have the clock $CLK_1$ having a frequency of 90 Hz be selected, however, the present invention is not limited to the case. That is, the display content $C_P$ may be displayed not only in the electronic mail screen but also in the operation screen or other screen. By placing the frequency divider which outputs the clock having a frequency of 90 Hz or more, for example, the clock with a frequency of 105 Hz, the controller 32 may output the selecting signal $S_C$ when the display content $C_P$ is displayed on the operation screen and when the high-level switching signal $S_{SW}$ is fed in order to have the clock $CLK_1$ having a frequency of 105 Hz be selected.

Also, a part or all of a technology described in any one of the above embodiments may be appropriated for technologies described in the above other embodiments, if neither contradictions nor problems arise in its purpose and configurations. For example, the acceleration sensor 52 shown in FIG. 6 may be mounted in the portable cellular phone shown in FIG. 2 and the control section 25, when the vibrating signal $S_V$ fed from the acceleration sensor 52 exceeds a specified value, may generate the designating signal $S_K$ used to designate a frequency-dividing ratio being less than a general frequency-dividing ratio and may feed it to the driving circuit 12.

Also, the present invention may be applied to either of a color display or a monochromic display.

Furthermore, the driving circuit for a display of the present invention may be applied to portable electronic devices other than portable cellular phones and PHS, for example, to computers such as notebook computers, palm-sized computers, and pocket computers, or PDAs.

What is claimed is:

1. A method for driving a display included in electronic device compnsing:

a step of automatically changing a scanning frequency of said display based on a classification of display content to be displayed on said display and mode of operation of said electronic device, said display is made up of a current-driving type light emitting device, wherein said classification of display content includes a degree of concern, recognition and necessity of data to be displayed.

2. The method for driving a display according to claim 1, wherein the change of said scanning frequency is made by changing a frequency dividing ratio of an oscillating signal to be produced to drive said display.

3. The method for driving a display according to claim 1, wherein scanning is performed sequentially on every one, every two or every three scanning electrodes for said display based on said display content.

4. The method for driving a display according to claim 1, wherein scanning is performed on only a scanning electrode of said display corresponding to a region in which said display content is to be displayed.

5. The method for driving a display according to claim 1, wherein said display content itself is changed according to said display content.

6. The method for driving a display according to claim 1, wherein said display is any one of displays made up of an electroluminescence device, a display made up of a light emitting diode, a display made up of a vacuum fluorescent display tube, an electric field emission display, or a plasma display.

7. The method for driving a display according to claim 1, wherein said mode of operation includes an operational screen, waiting screen, messaging screen.

8. The method for driving a display according to claim 1, wherein said scanning frequency is changes to reduce current consumption of said current-driving type light emitting device.

9. A method for driving a display comprising:

a step of automatically changing a scanning frequency of said display based on a display content to be displayed on said display made up of a current-driving type light emitting device, wherein, when said display content is made up of a plurality of display regions having a different characteristic, said scanning frequency is changed according to said corresponding characteristic for each of said plurality of display regions.

10. The method for driving a display according to claim 9, wherein, when said display content is made up of a plurality of display regions having said different characteristic, scanning is performed sequentially on every one, every two or every three scanning electrodes for said display in each of said plurality of display regions.

11. A driving circuit for a display comprising:

an oscillator to produce an oscillating signal having a specified frequency;

a frequency divider to divide a frequency of said oscillating signal at a specified frequency dividing ratio and to output it as a clock;

a controller to change said specified frequency dividing ratio of said frequency divider based on a designating signal used to set a scanning frequency of said display produced based upon a predetermined classification of a display content to be displayed on said display made up of a current-driving type light emitting device; and a row driver to generate an incoming voltage based on said clock and to said incoming voltage to each scanning electrode of said display.

12. The driving circuit for a display according to claim 11, wherein said designating signal, when said display content is made up of a plurality of display regions having a different characteristic, is generated to change said scanning frequency according to said corresponding characteristic in each of said plurality of display regions.

13. The driving circuit for a display according to claim 11, wherein said controller, based on said display content, sequentially has said row driver scan every one, every two or every three scanning electrodes of said display.

14. The driving circuit for a display according to claim 13, wherein said controller, when said display content is made up of a plurality of display regions having a different characteristic, sequentially has said row driver scan every one, every two or every three scanning electrodes of said display in each of said plurality of display regions.

15. The driving circuit for a display according to claim 11, wherein said controller has said row driver scan only a scanning electrode of said display corresponding to a region in which said display content is to be displayed.

16. The driving circuit for a display according to claim 11, wherein said controller changes said display content according to a predetermined classification of said display content.

17. The driving circuit for a display according to claim 11, wherein said display is any one of displays made up of an electroluminescence device, a display made up of a light emitting diode, a display made up of a vacuum fluorescent display tube, an electric field emission display, or a plasma display.

18. A driving circuit for a display comprising:

an oscillator to generate an oscillating signal having a specified frequency;

a plurality of frequency dividers to divide a frequency of said oscillating signal at a specified frequency dividing ratio and to output it as a clock;

a controller to generate and output a selecting signal indicating which clock output from said plurality of said frequency dividers is to be selected based upon a predetermined classification of a display content to be displayed on said display made up of a current-driving type light emitting device; and a row driver to select which clock output from said plurality of said frequency dividers based on said selecting signal and to generate an incoming voltage based on the selected clock and to feed the generated incoming voltage to each of scanning electrodes of said display.

19. The driving circuit for a display according to claim 18, wherein said controller, when said display content is made up of a plurality of display regions having a different characteristic, generates said selecting signal according to said corresponding characteristic in each of said plurality of display regions.

20. The driving circuit for a display according to claim 18, wherein said controller, based on said display content, sequentially has said row driver scan every one, every two or every three scanning electrodes of said display.

21. The driving circuit for a display according to claim 20, wherein said controller, when said display content is made up of a plurality of display regions having a different characteristic, sequentially has said row driver scan every one, every two or every three scanning electrodes of said display in each of said plurality of display regions.

22. The driving circuit for a display according to claim 18, wherein said controller has said row driver scan only a scanning electrode of said display corresponding to a region in which said display content is to be displayed.

23. The driving circuit for a display according to claim 18, wherein said controller changes said display content according to a predetermined classification of said display content.

24. The driving circuit for a display according to claim 18, wherein said display is any one of displays made up of an electroluminescence device, a display made up of a light emitting diode, a display made up of a vacuum fluorescent display tube, an electric field emission display, or a plasma display.

25. A portable electronic device comprising:

a display made up of a current-driving type light emitting device;

a driving circuit comprising: an oscillator to produce an oscillating signal having a specified frequency; a frequency divider to divide a frequency of said oscillating signal at a specified frequency dividing ratio and to output it as a clock; a controller to change said specified frequency dividing ratio of said frequency divider based on a designating signal used to set a scanning frequency of said display produced based on a display content to be displayed on said display; and a row driver to generate an incoming voltage based on said clock and to said incoming voltage to each scanning electrode of said display;

a main control section to control each component;

a main body and an acceleration sensor to detect vibration applied to said main body and to generate a vibrating signal and wherein said main control section, when said vibrating signal is at a level being not less than a specified value, changes said designating signal; and wherein said main control section feeds said display content and said designating signal to said controller in said driving circuit.

26. The portable electronic device according to claim 25, wherein said main control section changes said designating signal according to a remaining amount of electromotive force of a battery or a dry cell.

27. The portable electronic device according to claim 25, wherein said display content is displayed in at least two screens including a waiting screen in which, though power is applied, a user is waiting for an incoming call without said user using any operation, a screen save screen which displays said waiting screen and which is displayed to prevent image bum-in after a specified time has elapsed, an operation screen which is displayed when said user performs various operations, an electronic mail screen in which electronic mail being under creation and having received is displayed, and a conversation screen which is displayed during conversation.

28. The portable electronic device according to claim 25, wherein said display is any one of displays made up of an electroluminescence device, a display made up of a light emitting diode, a display made up of a vacuum fluorescent display tube, an electric field emission display, or a plasma display.

29. A portable electronic device comprising:

a display made up of a current-driving type light emitting device;

a driving circuit comprising: an oscillator to generate an oscillating signal having a specified frequency; a plurality of frequency dividers to divide a frequency of said oscillating signal at a specified frequency dividing ratio and to output it as a clock; a controller to generate and output a selecting signal indicating which clock output from said plurality of said frequency dividers is to be selected based on a classification of display content to be displayed on said display and mode of operation of said portable electronic device; and a row driver to select which clock output from said plurality of said frequency dividers based on said selecting signal and to generate an incoming voltage based on the selected clock and to feed the generated incoming voltage to each of scanning electrodes of said display;

a main control section to control each component; and wherein said main control section feeds said display content to said controller in said driving circuit.

30. The portable electronic device according to claim 29, wherein said display content is displayed in at least two screens including a waiting screen in which, though power is applied, a user is waiting for an incoming call without said user using any operation, a screen save screen which displays said waiting screen and which is displayed to prevent image bum-in after a specified time has elapsed, an operation screen which is displayed when said user performs various operations, an electronic mail screen in which electronic mail being under creation and having received is displayed, and a conversation screen which is displayed during conversation.

31. The portable electronic device according to claim 29, wherein said display is any one of displays made up of an electroluminescence device, a display made up of a light emitting diode, a display made up of a vacuum fluorescent display tube, an electric field emission display, or a plasma display.

32. The portable electronic device of claim 29, wherein said classification of display content includes a degree of concern, recognition and necessity of data to be displayed.

33. The portable electronic device of claim 29, wherein said mode of operation includes an operational screen, waiting screen, messaging screen.

34. The portable electronic device of claim 29, wherein said selecting signal is generated to reduce current consumption of said portable electronic device.

35. A portable electronic device comprising:

a display made up of a current-driving type light emitting device;

a driving circuit comprising: an oscillator to generate an oscillating signal having a specified frequency; a plurality of frequency dividers to divide a frequency of said oscillating signal at a specified frequency dividing ratio and to output it as a clock; a controller to generate and output a selecting signal indicating which clock output from said plurality of said frequency dividers is to be selected based on a display content to be displayed on said display; and a row driver to select which clock output from said plurality of said frequency dividers based on said selecting signal and to generate an incoming voltage based on the selected clock and to feed the generated incoming voltage to each of scanning electrodes of said display;

a main control section to control each component; and a main body and an acceleration sensor to detect vibration applied to said main body and to produce a vibrating signal, wherein said main control section, when said vibrating signal is at a level being not less than a specified value, generates a switching signal used to designate switching of a clock and feeds it to said controller and wherein said controller, based on said switching signal, changes a selecting signal and wherein said main control section feeds said display content to said controller in said driving circuit.

36. The portable electronic device according to claim 35, wherein said main control section generates said switching signal according to a remaining amount of electromotive force of a battery or a dry cell.

* * * * *